Sept. 3, 1968  C. H. FOX ETAL  3,399,532

POWER TRAIN

Filed Feb. 2, 1966

INVENTORS
CHARLES H. FOX
JOHN P. MANN

BY

JOHN F. SCHMIDT
ATTORNEY

United States Patent Office 3,399,532
Patented Sept. 3, 1968

3,399,532
POWER TRAIN
Charles H. Fox, Washington, and John P. Mann, Morton,
Ill., assignors to Westinghouse Air Brake Company,
Pittsburgh, Pa., a corporation of Pennsylvania
Filed Feb. 2, 1966, Ser. No. 524,529
5 Claims. (Cl. 60—54)

ABSTRACT OF THE DISCLOSURE

A fluid drive having a rotatably mounted housing forming an input member and rotatably supporting an output member, the housing including a filler tube to introduce a predetermined quantity of liquid. A fusible, temperature-sensitive plug is positioned adjacent the periphery of the housing remote from the filler tube, the plug being adapted to be contacted by the liquid during operation and adapted to discharge liquid from the housing when the liquid reaches a predetermined high temperature, as during a fluid drive stall condition. The housing further includes a first bore at one end thereof and a smaller bore axially inward from the first bore, the two bores forming a shoulder at their adjacent ends. A closure member having a fluid seal about its outer periphery is disposed in the smaller bore and a retainer ring is positioned in the first bore to cooperate with the shoulder to hold the closure member in place whereby the closure may be inserted in the housing without damage to the fluid seal.

---

Figure 1:
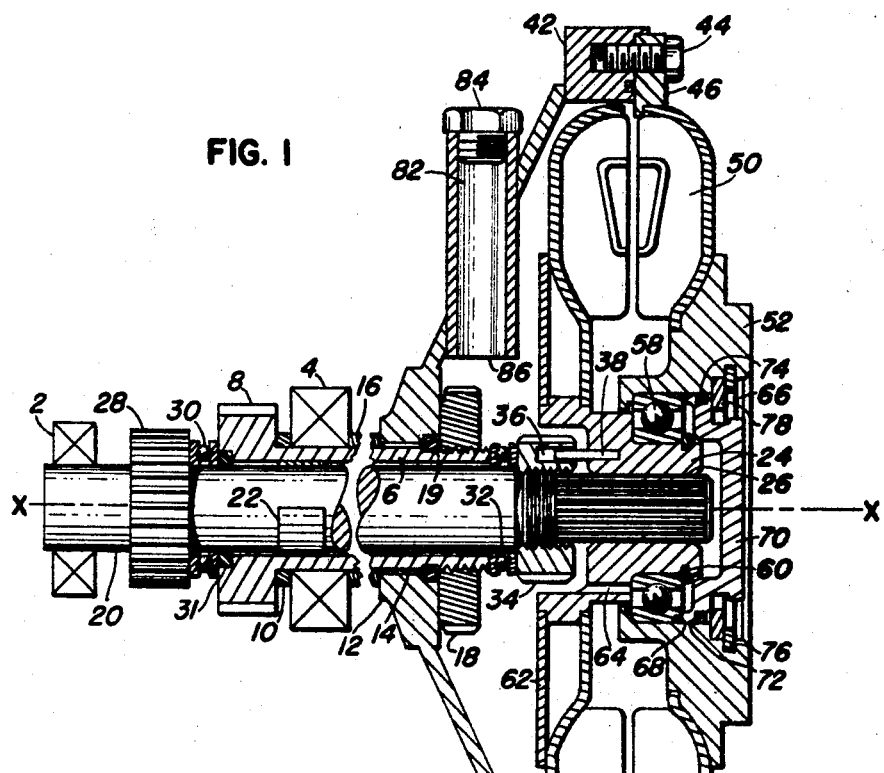

This invention relates to a power train, especially a power train of the type known to those skilled in the art as a fluid drive.

A fluid drive such as the one disclosed and claimed here is disclosed in a copending application, Drive Train, filed Jan. 24, 1966, by Charles H. Fox and Wayne H. McGlade jointly, S.N. 522,430. In the joint case referred to, there is set forth a set of circumstances in which a drive element having angular flexibility is highly desirable or even essential. In the circumstances outlined, a torque source drives, through a flexible element, a load which is highly variable and in which a sudden stopping of the load can damage the torque source or the load, or both if the drive is accomplished by a direct mechanical connection. It is accordingly an object of this invention to provide a power train in which angular resilience or yieldability minimizes the danger of damage to elements connected with either the input or the output of the power train. This and other objects are accomplished in a fluid drive which: makes possible supplying a predetermined quantity of liquid; provides a thermally responsive control to unload the drive upon slow-down or stall of the load before the torque source can be damaged; and can be manufactured at a reasonable cost.

Figure 2:
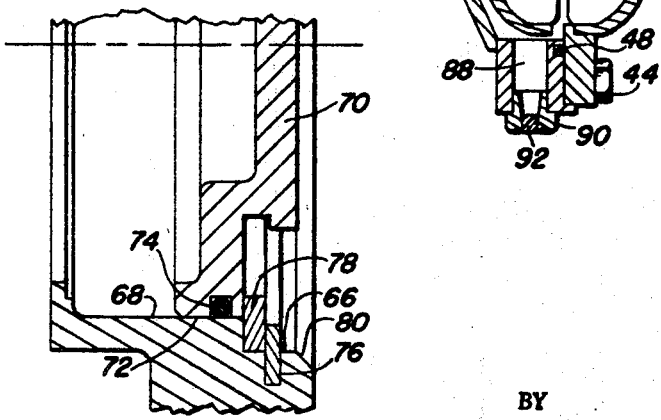

In the drawings:

FIG. 1 is a view in section substantially on a plane through the axis of rotation, and FIG. 2 is a section of a portion only of the device, on a larger scale than FIG. 1, and with the turbine hub and bearing omitted.

In the embodiment here shown, the power train is supported in suitable bearings indicated schematically at 2 and 4 which are preferably antifriction bearings, wherein bearing 4 may be utilized to locate the device laterally as well as to support it against gravity. A hollow shaft 6 is rotatably mounted by the bearing 4 and carries at its left end a gear 8 which is spaced from bearing 4 by a spacer ring 10. Hollow shaft 6 is externally splined to cooperate with internal splines in a hub 12, the splined connection being shown at 14. A spacer sleeve 16 spaces the left face of hub 12 from bearing 4; more specifically, hub 12 is clamped between spacer sleeve 16 and a nut 18 cooperating with threads on the end of the hollow shaft. A suitable fluid seal 19 is provided between the hollow shaft and the hub and is held in place by nut 18.

A second shaft 20 is rotatably carried inside the hollow shaft 6 and is spaced therefrom by a bearing sleeve 22. At its left end, shaft 20 is carried by bearing 2. At its right end, shaft 20 is externally splined to cooperate with internal splines in a hub 24, the splined connection being shown at 26.

Shafts 6 and 20 are supported against relative axial displacement. A gear 28 is secured on shaft 20 against angular and axial relative motion, and a thrust bearing 30 is disposed between gears 8 and 28. A lubricant seal 31 in the left end of hollow shaft 6 minimizes the loss of lubricant from the annular space between shafts 6 and 20. At the opposite end, shafts 6 and 20 support between them a second thrust bearing 32; more specifically, thrust bearing 32 is disposed between the right end of hollow shaft 6 and a nut 34 threaded onto shaft 20. Nut 34 is provided with two holes one of which is shown at 36, the two holes being disposed so that $$x = \phi(n + \tfrac{1}{2})$$

where $\phi$ is the angle betwen adjacent splines of the splined end of shaft 20, $n$ is any whole number, and $x$ is the angle between the hole centers, it being assumed that the holes are equidistant from the center of nut 34, and that the holes do not overlap.

Hub 24 carries a pin 38 which is adapted to engage one of the holes 36 in nut 34. The spacing between the holes, determined according to the above formula, is such that pin 38 is never more than $\tfrac{1}{4}\phi$ angle away from engagement with one of the holes. Accordingly, when nut 34 has been tightened to the specified torque, it needs to be turned ahead or back only a quarter of the angle between splines to get pin 38 into one of the holes, whereupon nut 34 is held locked in place.

The element of the power train which is referred to above as a flexible drive is preferably a fluid drive, in which an input member drives an output member through the medium of a liquid, either with or without torque multiplication. When such a drive is accomplished without torque multiplication, the drive may be known as a fluid coupling; when torque multiplication is involved, the drive is often called a torque converter.

In the embodiment shown, the fluid drive has an input member driven by a suitable torque source and an output member which is connected in any suitable manner to a load. A housing rotatable about a fixed axis constitutes one of said input and output members and rotatably supports the other one of said members. Thus, a conical element 40 is secured to hub 12, preferably in such a way as to form an integral part thereof. Conical element 40, at its periphery, supports a ring 42 to which is secured, by suitable threaded members 44, another ring 46. A suitable fluid seal 48 is disposed between rings 42 and 46.

Either of the fluid drive elements shown may be the input member. For the sake of simplifying the description, it is assumed in this discussion that gear 8 is the input gear, connected with a torque source which is not shown in this application of the invention. If it be further assumed that the fluid drive here illustrated is a fluid coupling, then the element 50, secured at its periphery in any suitbale manner to ring 46, is the impeller of the fluid coupling, being connected for driving by the input gear 8 through hollow shaft 6, splined connection 14, hub 12, conical element 40, and rings 42 and 46. Impeller 50 carries at its center a hub member 52 to complete the housing of the fluid drive. Thus, the complete housing constitutes the input member (impeller 50) and encloses the remaining member, turbine 56, of the fluid drive. Turbine 56 is mounted on hub 24, and hub 24 is rotatably supported in hub 52 by means of antifriction bearing 58. Antifriction bearing 58 is held on hub 24 by a snap ring 60. A reinforcing disc 62 provides additional support for turbine 56 on hub 24. A passage 64 in hub 24 allows fluid drive oil to flow to bearing 58 for lubrication.

Reference was made above to a fixed axis of rotation; this axis is shown at X—X. In effect, hub 52 is a wall of the housing, the wall having a substantially central opening through which the fixed axis passes. The opening consists of a first bore 66 and a second, smaller, bore 68. It will be seen that in the embodiment shown, the second or smaller bore 68 is the one which receives the antifriction bearing 58. For a better illusrtation and description of some of these deails, hub 24 and bearing 58 have been omitted from FIG. 2.

The opening formed by the two bores 66 and 68 must be closed in some suitable manner, and to that end, a closure element 70 is provided. Closure element 70 has a cylindrical surface 72 which is adapted to cooperate with the bore 68. The two cooperating surfaces are suitably packed by a lubricant seal such as that shown at 74.

Closure element 70 is held in place in the opening by a snap ring 76 engaging a groove in the bore 66. In the embodiment of the invention here shown, a washer 78 is disposed between the closure element 70 and the snap ring 76, washer 78 having an outside diameter which is substantially the same as the first bore 66. The opening is, moreover, chamfered as shown at 80.

The housing described above requires some means for adding oil from time to time, and to that end, a plugable filler tube 82 is provided in the conical element 40. Filler tube 82 has an open end outside the housing which is normally closed by a plug 84, and an open end 86 inside the housing. Filler tube 82 is preferably a straight piece of tubing, and is preferably disposed with its axis along a radius of the conical element 40, the radius intersecting axis X—X and perpendicular thereto. Filler tube 82 is so disposed that open end 86 determines the proper quantity of oil for the fluid drive. Thus, with filler tube 82 in a substantially vertiual position, and the plugable end up, the proper amount of oil can be supplied to the housing simply by pouring oil into filler tube 82 until the oil comes to the top of the tube. After the liquid level reaches the height of inner end 86, liquid traps air in the housing so that no more oil will enter the housing except for the small amount added because of the static head of oil in the tube.

To protect the torque source against excessive heating during high slip or stall, the invention includes means to unload the torque source before it can overheat to the point of destruction. In the embodiment shown, a temperature-sensitive device is incorporated in the housing to allow the oil to drain. Thus, ring 42 is provided with a radial hole 88, the outer end of which is threaded to receive a plug 90 having a fusible center 92. Fusible center 92 will be any one of a number of low-melting-point alloys designed to melt at a predetermined temperature, allowing fluid drive oil to drain from the housing by way of hole 88.

*Operation*

As will best be seen by reference to FIG. 2, closure element 70 can be slipped into bore 68 without moving seal 74 across a sharp edge, as might be the case if bores 66 and 68 were the same size. Assembly of the structure shown in FIG. 2 thus avoids damage to the seal 74 so that it is free to function as intended.

The filler tube design here shown and the method of filling the drive with oil described above prevents overfilling of the drive with oil. Accordingly, the fluid drive operates with a predetermined quantity of oil which will undergo a predetermined temperature increase after a predetermined amount of overload. The entire drive is designed to have the oil in the fluid drive overheat enough to melt fusible center 92, whereupon centrifugal force drains enough of the oil to unload the torque source before it suffers destructive damage. The power train is thereupon restored to operative condition by replacing plug 90 a new one, and refilling the housing with oil as described above.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a fluid drive having an input member and an output member, a housing rotatable about a fixed axis and constituting one of said members and enclosing the other of said members, the housing having a wall-forming portion provided with an opening through which said axis passes, the opening comprising a bearing bore of a given diameter and a retainer bore of a larger diameter, a bearing in the bearing bore rotatably supporting one of said members in the other member, a closure member having a surface cooperating with said bearing bore, a lubricant seal cooperating with the bearing bore and said closure member surface, and means in the retainer bore to hold the closure member in place.

2. A fluid drive as in claim 1 wherein the last-named means includes a groove in the retainer bore and a retainer ring in the groove.

3. A cylindrical member having a first bore at one end and a smaller bore immediately adjacent the first bore and axially inward therefrom, the two bores forming a shoulder at their adjacent ends, a closure member having an external cylindrical surface cooperable with said smaller bore and disposed therein, a fluid seal cooperating with the smaller bore and the external cylindrical surface, and means in the first bore cooperating with said shoulder to hold the closure in place.

4. A combination as in claim 3, wherein the last-named means includes a groove in the first bore and a retainer ring in the groove.

5. A combination as in claim 3, wherein the external cylindrical surface is provided with a groove, and the fluid seal is a sealing element lying in said groove and in sealing contact with the smaller bore.

References Cited

UNITED STATES PATENTS

| 2,226,511 | 12/1940 | Hollerith. | |
| 2,370,438 | 2/1945 | Basebe | 60—54 |
| 2,983,102 | 5/1961 | Sinclair | 60—54 |
| 3,118,279 | 1/1964 | Goudy | 60—54 |
| 2,631,432 | 3/1953 | Newcomb | 60—54 |

FOREIGN PATENTS 732,419  6/1932  France.

EDGAR W. GEOGHEGAN, *Primary Examiner.*